Nov. 24, 1925.
E. L. ACKER
1,563,059
DISK WHEEL
Filed May 15, 1922
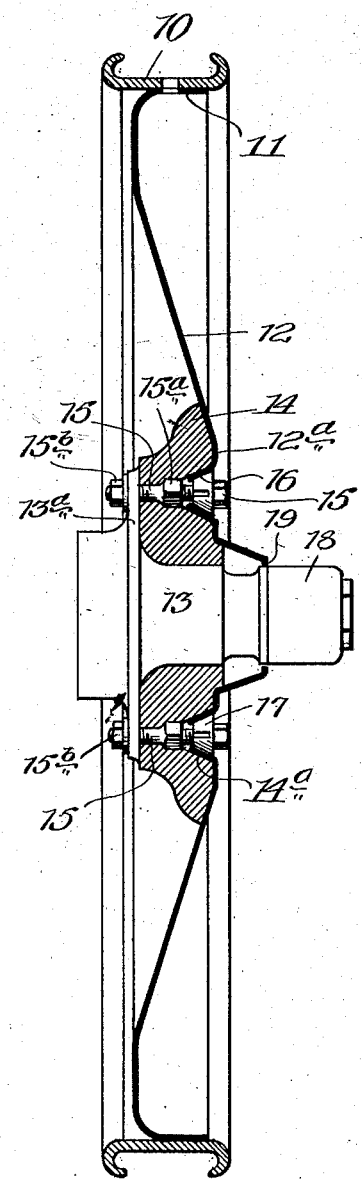
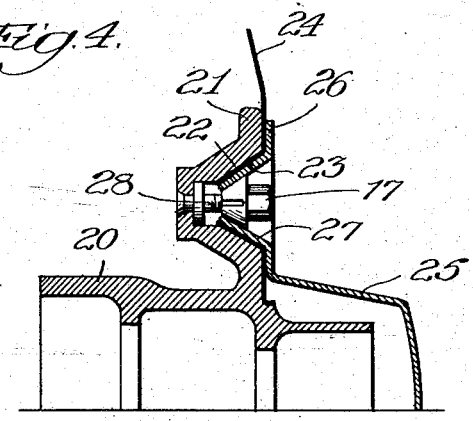
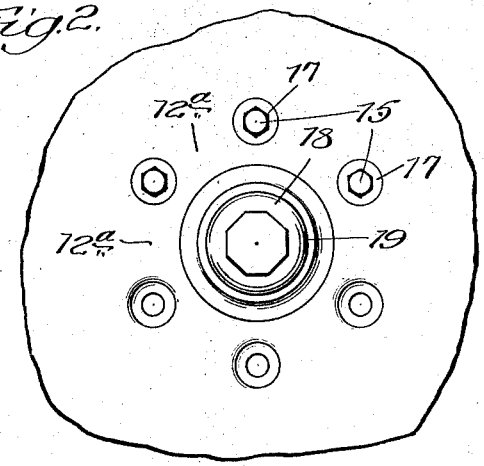
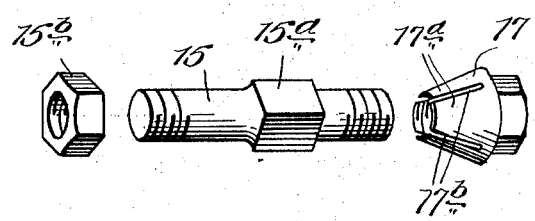
Inventor:
Elmer L. Acker,
By Dyrenforth, Lee, Chritton & Wiles,
Attys.

Patented Nov. 24, 1925.

1,563,059

UNITED STATES PATENT OFFICE.

ELMER L. ACKER, OF CHICAGO, ILLINOIS.

DISK WHEEL.

Application filed May 15, 1922. Serial No. 561,106.

*To all whom it may concern:*

Be it known that I, ELMER L. ACKER, a citizen of the United States, residing at Chicago, in the county of Cook and State of Illinois, have invented a new and useful Improvement in Disk Wheels, of which the following is a specification.

This invention relates to disk wheels and is fully described in the following specification and shown in the accompanying drawing, in which:

Figure 1 is a transverse section through the wheel embodying the invention;

Fig. 2 is a partial, front elevation of the same;

Fig. 3 is a perspective view of the bolt and nut used therein; and

Fig. 4 is a partial transverse section showing a modified form of the wheel shown in Fig. 1.

In the embodiment shown in Fig. 1, the wheel consists of a rim 10 secured upon the flange 11 of the disk 12 by any suitable means such as spot welding. The disk 12 is secured upon the hub 13 by means of an adapter 14 and bolt 15 passing through the disk, adapter, and hub.

Conical cup-shaped projections 16 are arranged preferably concentrically about the axis of the hub, and are raised from a substantially flat portion 12ª. These are adapted to project into and closely fit corresponding cup-shaped depressions 14ª in the adapter 14. The bolt 15 preferably has a shoulder 15ª by which it may hold the adapter 14 firmly against the hub flange 13ª, into which it is screwed and to which it is locked by means of the lock-nuts 15ᵇ. The opposite end of the bolt 15 passes through the depression 16 and is threaded to receive the conical cap nut 17 which has a taper substantially equal to that of the inner surface of the projection 16.

It will thus be seen that as the cap nuts 17 are screwed down they will force the projections 16 firmly into the depressions 14ª and as they do so the ears 17ª produced by the longitudinal slots 17ᵇ in the cap nuts will be pressed inwardly upon the bolt 15 thereby firmly locking the cap nut 17 thereon.

Practically the entire stress on the wheel is transferred through the projections 16 and the depressions 14ª to the adapter 14 which may be made of any suitable material.

The hub is preferably supplied with a hub cap 18 and a central opening 19 is made in the center of the disk 12 so that the disk can be slipped over the hub cap when assembling or disassembling without removing the hub cap.

Referring now to the form shown in Fig. 4, the hub 20 carries a radial flange 21 in which is formed a series of depressions 22, each of which is adapted to receive the corresponding conical projection 23 on the disk 24.

In this form I have also provided a cover plate 25 having a radial flange 26 in which is formed a series of conical cups 27, each adapted to fit into one of the conical projections 23.

These parts are then held together by means of threads 28 and slotted conical cap nuts 17 as previously described.

While I have shown and described but two embodiments of my invention, it is to be understood that it is capable of many modifications. Changes, therefore, in the construction and arrangement may be made without departing from the spirit and scope of the invention as disclosed in the appended claims, in which it is my intention to claim all novelty inherent in my invention as broadly as possible in view of the prior art.

What I claim as new, and desire to secure by Letters Patent, is:

In combination with a wheel rim and a wheel hub having an outwardly extending flange, a relatively thick solid adapter disposed on the hub in intimate contact therewith throughout its thickness and to an extent substantially equal to the width of the rim and abutting said flange, means securing said adapter to said flange, the outer surface of the adapter adjacent its marginal edge inclining toward the plane of the hub flange, and a disk supporting said rim, said disk intimately fitting and being secured against the outer surface of said adapter and having a portion disposed at substantially the same inclination as said inclined surface directly engaging the latter and extending inwardly to an extent substantially equal to the width of the rim.

ELMER L. ACKER.